United States Patent Office 3,577,373
Patented May 4, 1971

3,577,373
WAX COMPOSITIONS CONTAINING AN ETHYLENE-ISOBUTYLACRYLATE COPOLYMER AND AN ORGANIC ACID
Charles J. Kremer, Brookhaven, and Donald S. Brown, Havertown, Pa., Dominic Apikos, Laurel Springs, N.J., and John T. Thean, Philadelphia, Pa., assignors to Atlantic Richfield Company, Philadelphia, Pa.
No Drawing. Filed Dec. 9, 1968, Ser. No. 782,408
Int. Cl. C08f 21/04, 45/52
U.S. Cl. 260—23     18 Claims

ABSTRACT OF THE DISCLOSURE

This invention relates to wax compositions containing an acid component and an ethylene-isobutylacrylate copolymer. These compositions have highly improved resistance to stress cracking, and improved break energy and film toughness. They can be utilized as hot melt coatings for items such as paperboard and corrugated board for use in the food packaging industry.

---

In U.S. application Ser. No. 457,218, now abandoned, filed May 19, 1965 in the name of Charles J. Kremer there is disclosed improved wax compositions which contain wax, an ethylene/vinyl acetate copolymer and an acid. These compositions have improved physical properties such as tensile strength, elongation, break energy, flex strength and seal strength. In U.S. application Ser. No. 557,901, filed June 16, 1966 in the name of Charles J. Kremer, now U.S. Pat. No. 3,417,040, issued Dec. 17, 1968, there is disclosed an improvement in this basic wax system which comprises utilizing as the acid a component which contains both a liquid and an acid. These compositions have properties which are even superior to the basic wax/acid system.

While these wax/acid compositions have many improved physical properties, no improvement was reported for their resistance to stress cracking. As used throughout the specification and claims "resistance to stress cracking" means the ability of a sample to resist cracking at points of internal stress in the material. This property is extremely important in case of molded and extruded containers; pipes and coated board stock particularly when used by the packaging industry for folded cartons. In molded, extruded containers and folded cartons the stress is pronounced above the edges and scores and in pipes all along the circumference. Stress failure is accelerated by surface-active liquids such as soap or salt solutions. In packaging applications which utilize salted crushed ice during shipping, the stress cracking of the coated board permits the water to penetrate into the board.

It has now been discovered that if an ethylene-isobutylacrylate copolymer is utilized in place of an ethylene/vinyl acetate copolymer in the above described wax/acid systems, tremendous improvements are obtained in the stress cracking resistance of the composition.

Therefore, it is an object of this invention to provide wax/acid systems which have improved resistance to stress cracking.

In general the compositions of this invention comprise in parts by weight (A) 100 parts of a wax having a melting point of greater than 120° F., (B) from 5 to 100 parts of an ethylene-isobutylacrylate copolymer having a polymerized isobutylacrylate content ranging from 15 to 40 weight percent and a melt index ranging from 0.1 to 500 and, (C) a wax-compatible, non-corrosive carboxylic acid in an amount sufficient to impart to the composition a total acid number ranging from 5 to 200, said acid itself having an acid number in excess of 20.

The wax component utilized in the composition of this invention can be of mineral, vegetable, animal or synthetic origin or mixtures thereof. The waxes must have a melting point greater than 120° F. Examples of various types of waxes are given in U.S. application Ser. Nos. 557,901 and 457,218, heretofore referred to, which are hereby incorporated by reference into this specification.

The use of petroleum waxes represents a preferred embodiment of this invention. These waxes include paraffin waxes which have a melting point from 120° F. to 200° F. and the microcrystalline waxes having a melting point from 140° F. to 210° F. These waxes may be fully refined and thus contain very small amounts of hydrocarbon oils or they may be semi-refined (slack waxes) and have hydrocarbon oil contents of up to about 30 percent.

The most preferred compositions of this invention utilize a wax component containing from 60 to 80 percent by weight of a paraffin wax having a melting point ranging from 120° F. to 180° F. and from 20 to 40 percent of microcrystalline wax having a melting point ranging from 140° F. to 200° F. This wax mixture can be utilized for coatings which will be subjected to high temperatures. Increasing the concentration of microcrystalline wax will impart a higher maximum use temperature and improve the ultimate physical strength while decreasing dimensional stability. With respect to paraffin waxes as a class the use of a non-normal paraffin wax imparts higher physical strength than the use of normal base paraffin waxes.

The use of an ethylene-isobutylacrylate copolymer is critical to the practice of this invention. This ethylene-isobutylacrylate copolymer should have a polymerized isobutylacrylate content ranging from 15 weight percent to about 40 weight percent and a melt index ranging from 0.1 to about 500 (ASTM D 1238–65T). The preferred copolymers are those having a polymerized isobutylacrylate content ranging from 20 weight percent to 35 weight percent and a melt index ranging from about .1 to about 300. The most preferred ethylene-isobutylacrylate copolymers contain from 20–25 percent polymerized isobutylacrylate and have melt indices ranging from 0.1 to 25. Because high copolymer concentrations will cause an undesirable increase in the hot melt viscosity the concentration of copolymer should be the minimum amount necessary to impart the desired physical properties to the composition. Concentrations ranging from about 5 to about 100 parts by weight per 100 parts of wax are operable. Preferably, the concentration of copolymer ranges from about 5 to about 60 parts per 100 parts of wax. Most preferably it ranges from 10 to 35 parts per 100 parts wax.

In general, any carboxylic acid which is wax-compatible, non-corrosive and has an acid number in excess of 20 can be utilized in the compositions of this invention. It should be understood that a mixture of carboxylic acids can also be used in the compositions of the present invention. The carboxylic acid must not be corrosive to the extent that it will attack the metal parts of equipment or containers. In general, the lower molecular weight carboxylic acids such as, for example, formic, acetic, propionic, benzoic acids and the like are very corrosive and in addition are generally incompatible with wax.

The carboxylic acid preferably should have an acid number in excess of about 30 although acids with a lower acid number, i.e., about 20, can be used. Materials with a lower acid number, i.e., those of higher molecular weight are not desirable because they increase the viscosity of the molten composition without imparting corresponding or comparable increases in the desired properties. Acid number is used herein as it is normally understood by those skilled in the art, i.e., it is the number of milligrams of alcoholic potassium hydroxide required to neutralize 1 gram of the substance being tested in the presence of methyl orange. Any aliphatic, alicyclic, or aromatic acid having one or more carboxyl groups may be used in the compositions of this invention provided, however, that such acids are wax-compatible, noncorrosive and have an acid number in excess of about 20. The aliphatic carboxylic acids can be saturated or unsaturated. Exemplary saturated aliphatic carboxylic acids are nonanoic acid, lauric acid, tetradecanoic acid, pentacosanoic acid, natural occurring acids such as for example coconut fatty acid and tallow fatty acid, sebacic acid, 2-butyl-2-ethyl glutaric acid, and 2-propyl-1,2,4-pentane tricarboxylic acid. Exemplary unsaturated aliphatic carboxylic acids are oleic acid, linoleic acid, linolenic acid, and 5-octene-3,3,6-tricarboxylic acid. The alicyclic carboxylic acid may be saturated or unsaturated. Exemplary saturated alicyclic carboxylic acids are the naphthenic acids (cycloparaffinic acids), including those which have one or more alkyl side chains of varying length such as cyclohexane pelargonic acid. Examplary unsaturated alicyclic carboxylic acids are abietic acid and acids obtained by dimerizing or trimerizing higher molecular weight unsaturated fatty acids such as for example, oleic or linoleic acid. Aromatic acids such as for example naphthoic, anthroic, alkyl substituted phthalic acid, and alkyl substituted naphthalic acid may also be used in the practice of this invention.

Carboxylic acids that contain functional groups other than the carboxylic group such as aldehyde, keto or hydroxyl groups can also be used in the compositions of this invention provided, however, that the functional group does not hinder the carboxyl moiety. Consequently, acids such as 12-hydroxystearic acid and oxidized petroleum waxes having an acid number in excess of about 20 can be also utilized in the compositions of this invention. Acids containing small proportions of other elements such as nitrogen, sulfur, oxygen, phosphorous, etc. can also be utilized provided the additional elements do not hinder the carboxyl moiety. Examples of various acids which can be utilized are set forth in the two U.S. applications previously referred to (Ser. Nos. 457,218 and 557,901) which are hereby incorporated by reference into this specification.

A preferred carboxylic acid is abietic acid, a source of which is wood rosin which contains more or less abietic acid depending on how it is chemically modified. Thus the products of wood rosin which have been subjected to such chemical treatments as isomerization, air oxidation, hydrogenation, disproportionation, or dimerization are also suitable as the carboxylic acid component. By subjecting the wood rosin to any of the above treatments, the relative amounts of the acids which comprise the wood rosin are changed and conseqeuntly, the properties of the wood rosin may be varied to obtain the particularly desired properties. For instance, by oxidizing the wood rosin, it is possible to obtain a product with an increased softening point. Hydrogenation of the wood rosin results in a product with improved color stability. By submitting the wood rosin to disproportionation, a product with improved oxidation resistance is obtained. Dimerization of the wood rosin yields a product of higher softening point. The methods of modifying wood rosin by any one of the above chemical operations are well known to those skilled in the art and the products obtained therefrom are available commercially.

As set forth in U.S. application Ser. No. 557,901 superior properties results from the use of an acid component which contains both an acid and a liquid. This can be accomplished by either using a liquid acid or by using a solid acid (such as rosin) in combination with a liquid acid or non-acid. This combination should contain at least 35 weight percent of an organic acid having an acid number greater than 20. Secondly, it should contain at least 5 weight percent of an organic liquid. Both the organic acid and the organic liquid should have a boiling point greater than 300° F. at 7 mm. of mercury and both must be compatible with the wax and ethylene-isobutyl-acrylate copolymer at the temperature at which the hot melt coating is being applied. Most preferably, the organic acid has an acid number in excess of 30 and is present in the acid component in an amount in excess of 50 weight percent. Preferably, the organic liquid is present in the acid component in an amount in excess of 20 weight percent.

While the preferred acid component must contain both an acid and a liquid, both of these requirements can be satisfied by utilizing an organic carboxylic acid which is also a liquidat 70° F. On the other hand, both liquid organic acids and liquid organic non-acids can be used in the same composition if desired. For example, liquid acids such as the oligomers of fatty acids can be utilized alone or with a solid organic acid or a liquid organic non-acid. If a liquid organic carboxylic acid is used, it must have a melting point below 70° F., have a viscosity at 100° F. ranging from 500–10,000 SSU, have a molecular weight ranging from 400–2500 and have an acid number in excess of 20. Preferably, the acid has a viscosity at 100° F. ranging from 500–2000 SSU and an average molecular weight ranging from 400–800. Preferred liquid acids are the dimerized and trimerized fatty acids containing from 16–22 carbon atoms; for example, dimerized or trimerized oleic, arachidonic, sorbic or eicosenic acids. Most preferred are the dimerized, and trimerized eighteen carbon fatty acids, such as dimerized or trimerized oleic or linolenic acids.

Organic carboxylic acids which are not liquids at 70° F. can be utilized if combined with at least 5 weight percent of an organic liquid. This solid organic carboxylic acid must have an average molecular weight ranging from 150 to 1500 and an acid number in excess of 20. Preferably, this acid has an average molecular weight ranging from 400–800 and has a melting point ranging from 120°–200° F. A preferred solid organic carboxylic acid is abietic acid which is commonly found in wood rosins.

The organic liquids which can be utilized in the practice of this invention must be liquids at 70° F. and have a boiling point greater than 300° F. at 7 millimeters of mercury. As previously stated, the acid component must contain at least 5 percent of a liquid organic acid or a liquid organic non-acid. If a liquid organic non-acid is utilized it must be a hydrocarbon compound selected from the group consisting of oils or a styrene, butene or propene polymer.

The oil which can be utilized as an organic liquid can be any hydrocarbon oil having a viscosity at 100° F. ranging from 300–3000 SSU. Preferably, the oil has a viscosity at 100° F. ranging from 500–1500 SSU. The most preferred oil is a refined white oil.

The styrene polymers which can be utilized as the organic liquid in this invention must have a viscosity at 100° F. ranging from 800–100,000 SSU and an average molecular weight ranging from 300–3,000. Preferably, the viscosity at 100° F. ranges from 800 to 3500 SSU and the average molecular weight ranges from 300–1500. These polymers can be prepared by polymerizing various styrene monomers to produce low molecular weight polymers. A mixture of styrene monomers can also be polymerized. For example, suitable polymers can be derived from styrene, alpha-methyl styrene or alkylated styrenes such as alkylated alpha-methyl styrene, alkylated alpha-methyl para-methyl styrene, or alkylated para-methyl styrene or mixtures thereof. A particularly suitable polymer of this type is produced by the simultaneous alkylation and polymerization of monomeric styrene, alpha-methyl styrene, alpha-methylparamethyl styrene, para-methyl styrene or a mixture of these monomers.

The butene polymers which can be utilized as the organic liquids in this invention must contain at least 90 percent by weight butene and have a viscosity at 100° F. ranging from 1000 to 1,000,000 SSU and an average molecular weight ranging from 300–12,000. Copolymers containing butene and up to 10 percent of another lower mono-olefin can also be utilized. Preferably the butene polymer is a homopolymer which has a viscosity at 100° F. ranging from 10,000 to 200,000 and an average molecular weight ranging from 800–3000. Most preferably the average molecular weight ranges from 1600 to 2500. The most preferred butene polymer is one prepared by the polymerization of butene-1 or isobutylene.

The propene polymer which can be utilized as an organic liquid in this invention has a viscosity at 100° F. ranging from 10,000–1,000,000 SSU and an average molecular weight ranging from 800–3500. Preferably, this polymer has a viscosity at 100° F. ranging from 20,000 to 50,000 SSU and an average molecular weight ranging from 1000 to 2000.

Preferred compositions can be prepared by utilizing as the acid component a mixture of rosin acid and dimerized fatty acids or a mixture of rosin acid and styrene polymer. For example, the acid component can contain from 7 to 95 percent by weight rosin acid and from 5 to 30 percent by weight of a dimer of 9,12-octadecadienoic acid or a styrene homopolymer.

The acid component is incorporated into the compositions of this invention in an amount sufficient to impart thereto an acid number ranging from 5–200. Most preferably, it is present in an amount sufficient to impart an acid number ranging from 10–75. The concentration of acid component necessary to impart the required acid number will, of course, depend on the particular acid utilized, but generally it ranges from 10 to 150 parts by weight per 100 parts wax.

Ingredients commonly added to wax or ethylene-vinyl acetate copolymers can be incorporated into the compositions of this invention in functional amounts without departing from the scope thereof. Examples of these ingredients include but are not limited to: heat and ultraviolet light stabilizers, inert fillers, secondary plasticizers, anti-blocking agents, pigments and colorants, antioxidants, gloss stabilizers, viscosity-index improvers, solvents, anti-scuff agents, etc. Specifically, ingredients such as the solid glycol esters of rosin acids can be added to improve color, odor and heat stability.

The preparation of the compositions of this invention is not critical to the practice. For example, these compositions can be prepared by heating the wax to a temperature above its melting point, adding the ethylene-isobutylacrylate copolymer, acid component and other additives and agitating vigorously until a homogeneous hot melt is obtained. The acid component, however, facilitates the dispersion of the copolymer. Therefore, it is preferable to incorporate the acid component into the melted wax prior to the addition of the copolymer. A specific method for preparation is as follows: the waxes are melted together, any anti-oxidants or heat stabilizers are added and the melt is then brought to a temperature above about 200° F. The acid component is heated to about 275° F. and mixed with the ethylene-isobutyl acrylate copolymer. This mixture is then added to the melted wax accompanied by vigorous stirring.

The following examples are given to illustrate specific embodiments of this invention and should not be construed as limitations to the scope of the invention.

EXAMPLE I

A basic wax formulation having the following components in parts by weight was prepared.

| Basic recipe: | Parts |
|---|---|
| Wax [1] | 100 |
| Copolymer (as defined in Table I) | 20 |
| Rosin acid [2] | 38.4 |
| Dimerized fatty acid [3] | 8.3 |

[1] A refined paraffin wax having a melting point of 150° F. (ASTM D–87).
[2] A high degree of disproportionation wood rosin with a melting point of 181° F. (ring and ball) acid number of 154, saponification of 189 and an average molecular weight of 450.
[3] A dimerized 9,12-octadecadienoic acid having a melting point of 35° F., an acid number of 190 and a viscosity of 100° SSU.

The blend was prepared as follows. The rosin acid and dimerized fatty acid were heated to 275° F. The specific copolymer (as designated in Table I) was then added to the acids and agitated until uniformly dispersed. The wax was melted and heated to 200° F. and then added to the hot acid/polymer mix. The polymers are identified in the table as EVA (ethylene-vinyl acetate copolymer) and EIBA (ethylene-isobutylacrylate copolymer). Test samples were prepared by pouring the hot melt between two stationary barriers 5 inches apart having a height of 92 mils, ±2 mils.

TABLE I

| | Formulation No. | | | | |
|---|---|---|---|---|---|
| | 1 | 2 | 3 | 4 | 5 |
| Type copolymer | EVA | EIBA | EIBA | EIBA | EIBA |
| Melt index (ASTM D-1238-65T) | 1 | 2.5 | 21 | 250 | 2.5 |
| Isobutyl acrylate, percent | | 21 | 21 | 21 | 31 |
| Vinyl acetate, percent | 28 | | | | |
| Properties: | | | | | |
| Viscosity of the hot melt at 250° F., centipoises | 312 | 364 | 165 | 77 | 382 |
| Stress cracking, min.* | 4 | 58 | 77 | 70 | 18 |
| Pen. Hardness at 110° F. (ASTM D-1321) | 20 | 24 | 28 | 29 | 26 |

*The stress cracking test utilized is a modification of ASTM D-693-60T. The procedure is as follows: Four test strips ½″ x 2½″ were cut from two cast slabs of 92 mils in thickness. The four test strips are then aged at 73° F. ±2° F. and 50 percent ±5 percent relative humidity for 24 hours. A detergent solution was then prepared containing 4½ gallons of distilled water, 5 ounces of dioctyl sodium sulfosuccinate (Aerosol OT-75 percent active) and 25 grams of acid black concentrated dye. After aging, the two ends of the test strip are brought together to form a loop and clamped in that position with a pinchcock. The loop with the clamp is immediately immersed in the detergent solution. A second strip is also immediately prepared and placed in the solution. The two samples are then inspected initially at 30-second intervals and one minute intervals thereafter for the appearance of stress cracks which appear on the outermost edge of the loop. The time which is recorded in minutes is that when the first sign of hairline cracks show in the sample. After the first pair of samples fail, the procedure is repeated with the second pair of strips. The results of the four test strips are then averaged and reported as the stress cracking.

In Table I it is shown that wax-acid compositions containing the ethylene-isobutyl acrylate copolymer have as much as 19 times more stress cracking resistance than similar compositions containing an ethylene/vinyl acetate copolymer.

EXAMPLE II

The procedure of Example I was repeated with the exception that a liquid styrene polymer was substituted for the rosin acid and a mixture of waxes was utilized. The formula had the following proportions in parts by weight.

| | Parts |
|---|---|
| Paraffin wax [1] | 67 |
| Microcrystalline wax [6] | 33 |
| Copolymer (as utilized for Formulation 3, Example I) | 20 |
| Liquid styrene polymer [5] | 38.4 |
| Dimerized fatty acid [3] | 8.3 |

[1, 3] As defined in Example I.
[5] A viscous liquid polystyrene having an initial boiling point of 310° F. at 7 millimeters of mercury pressure, an average molecular weight of 325–350, a specific gravity of about 1.03 and a viscosity at 100° F. at approximately 1500 SSU.
[6] A microcrystalline wax having a melting point of 175° F. (ASTM D-127).

The viscosity of the hot melt at 250° F. was 133 centipoises. Test samples were prepared and measured in the same manner as described in Example I. The stress cracking occurred at 110 minutes. The Pen hardness was 45 at 110° F.

EXAMPLE III

The procedure of Example I was utilized to prepare the formulations of Table III. Due to the absence of acids in Formulation No. 7 the copolymer was added directly to the heated wax. The amounts are in parts by weight.

TABLE III

| Formulation No | 7 | 8 |
|---|---|---|
| Wax [1] | 100 | 100 |
| EIBA copolymer [5] | 13.6 | 20 |
| Rosin acid [2] |  | 38.4 |
| Dimerized fatty acid [3] |  | 8.3 |
| Properties: |  |  |
| Viscosity at 250° F., centipoises | 180 | 286 |
| 180° flex No.[6] | 0 | 60 |
| Tensile yield, p.s.i.[6] | 950 | 370 |
| Elongation, percent [6] | 2 | 31 |
| Break energy, ft.-lb./cu. in.[6] | 0.54 | 6.1 |
| Stress cracking,* min | 0 | 77 |

[1], [2], and [3] as defined in Example I;
[5] 21 percent isobutyl acrylate, melt index of 2.5.
[6] As defined in U.S. Ser No. 557, 901 heretofore referred to.
*As defined in Table I.

From the above tabulation it will be noted that the composition containing the ethylene-isobutylacrylate copolymer and acids has vastly superior physical properties. For example the flex number is 60 times greater; the elongation is 15 times longer; the break energy is 11 times higher and the stress cracking is 77 times better in the copolymer/acid system than with the basic copolymer system.

The compositions of this invention can be utilized in numerous wax coating applications such as in food carton packaging especially for wet-pack shipping of perishable foods such as poultry, beef and various fruits.

We claim:
1. A composition comprising in parts by weight:
 (A) 100 parts of a wax having a melting point greater than 120° F.,
 (B) from 5 to 100 parts of an ethylene-isobutylacrylate copolymer having a polymerized isobutylacrylate content ranging from 15 to 40 weight percent and a melt index ranging from 0.1 to 500, and
 (C) in an amount sufficient to impart to the composition a total acid number ranging from 5 to 200, a wax compatible non-corrosive carboxylic acid selected from the group consisting of:
  (1) an organic carboxylic acid which is a liquid at 70° F., has a viscosity at 100° F. ranging from 500 to 10,000 SSU, and average molecular weight ranging from 400 to 2500, and an acid number in excess of 20,
  (2) an organic carboxylic acid which has a melting point above 70° F., an average molecular weight ranging from 150 to 1500, and an acid number in excess of 20, and
  (3) mixtures of (1) and (2).

2. A composition according to claim 1 wherein the acid component of (C) is present in an amount sufficient to impart to the composition an acid number ranging from 10–75.

3. A composition according to claim 1 wherein the ethylene-isobutylacrylate copolymer contains from 20 to 35 weight percent polymerized isobutylacrylate.

4. A composition according to claim 1 wherein the ethylene-isobutylacrylate copolymer has a melt index ranging from 0.1 to 25.

5. A composition according to claim 1 wherein the concentration of ethylene-isobutylacrylate copolymer ranges from about 5 to about 60 parts per 100 parts of wax.

6. A composition according to claim 5 wherein the concentration of ethylene-isobutylacrylate copolymer ranges from 10 to 35 parts per 100 parts by weight wax.

7. A composition according to claim 1 wherein the wax is a petroleum wax.

8. A composition according to claim 1 wherein:
 (A) the wax component is a blend containing from 20–80 parts paraffin wax and from 80–20 parts of a microcrystalline wax,
 (B) the ethylene-isobutylacrylate copolymer has a polymerized isobutylacrylate content ranging from 20 to 25 percent by weight, a melt index ranging from 0.1 to 25 and is present in an amount ranging from 10 to 35 parts, and
 (C) the acid component is present in an amount sufficient to impart to the composition an acid number ranging from 10–75 and is a mixture comprising
  (1) from 10 to 30 percent by weight of a dimer of 9,12-octadecadienoic acid
  (2) from 70 to 90 percent by weight of a styrene homopolymer having an average molecular weight ranging from 300 to 1500 and a viscosity at 100° F. ranging from 800 to 3500 SSU.

9. A composition according to claim 1 wherein the acid component has both liquid and acid properties said component containing at least 35 percent by weight acid and at least 5 percent by weight liquid, all having boiling points greater than 300° F. at 7 millimeters of mercury, said acid being selected from the group consisting of:
 (A) an organic carboxylic acid which is a liquid at 70° F., has a viscosity at 100° F. ranging from 500 to 10,000 SSU, and average molecular weight ranging from 400 to 2500, and an acid number in excess of 20,
 (B) an organic carboxylic acid which has a melting point above 70° F., an average molecular weight ranging from 150 to 1500, and an acid number in excess of 20, and
 (C) mixtures of (A) and (B).
said liquids being selected from the group consisting of:
 (1) an organic carboxylic acid which is a liquid at 70° F., has a viscosity at 100° F. ranging from 500 to 10,000 SSU, and average molecular weight ranging from 400 to 2500, and an acid number in excess of 20,
 (2) a hydrocarbon which is a liquid at 70° F. selected from the group consisting of:
  (a) an oil having a viscosity at 100° F. ranging from 300 to 3,000 SSU,
  (b) a styrene polymer having a viscosity at 100° F. ranging from 800 to 100,000 SSU and an average molecular weight ranging from 300 to 3,000,
  (c) a butene polymer containing at least 90 percent by weight butene, having a viscosity at 100° F. ranging from 1000 to 1,000,000 SSU and an average molecular weight ranging from 300 to 12,000,
  (d) a propene polymer having a viscosity at 100° F. ranging from 10,000 to 1,000,000 SSU and an average molecular weight ranging from 800 to 3,500, and
 (3) mixtures of (1) and (2).

10. A composition according to claim 9 wherein:
 (A) the wax component is a blend of paraffin wax and microcrystalline waxes,
 (B) the ethylene-isobutylacrylate compolymer has a polymerized isobutylacrylate content ranging from 20 to 35 percent by weight, a melt index ranging from 0.1 to 25 and is present in an amount ranging from 5 to 60 parts, and
 (C) the acid component is present in an amount sufficient to impart to the composition an acid number ranging from 10–75 and is a mixture comprising:
  (1) from 70 to 95 percent by weight of rosin acids, and (2) from 5 to 30 percent by weight of a dimer of 9,12-octadecadienoic acid.

11. A composition according to claim 9 wherein the acid component of (3) is a mixture containing a styrene polymer and rosin acids.

12. A composition according to claim 9 wherein the liquid organic carboxylic acid of (A) is a dimerized fatty acid containing from 16 to 22 carbon atoms.

13. A composition according to claim 9 wherein the hydrocarbon oil of (2)–(a) is a refined white oil.

14. A composition according to claim 9 wherein the styrene polymer of (2)–(b) is a homopolymer having an average molecular weight ranging from 300 to 1500 and a viscosity at 100° F. ranging from 800 to 3500 SSU.

15. A composition according to claim 9 wherein the butene polymer of (2)–(c) is a isobutylene homopolymer having an average molecular weight ranging from 800 to 3000 and a viscosity at 100° F. of 10,000 to 200,000 SSU.

16. A composition according to claim 9 wherein the propene polymer of (2)–(d) is a homopolymer having an average molecular weight ranging from 1000 to 2000 and a viscosity at 100° F. ranging from 20,000 to 50,000 SSU.

17. A composition according to claim 9 wherein the solid organic carboxylic acid of (2) contains a major amount of abietic acid.

18. A composition according to claim 9 wherein the acid component of (3) is a mixture of liquid and non-liquid organic carboxylic acids.

References Cited
UNITED STATES PATENTS 3,417,040   12/1968   Kremer _____ 260—27

DONALD E. CZAJA, Primary Examiner

R. W. GRIFFIN, Assistant Examiner

U.S. Cl. X.R.

117—122, 161, 168; 260—28.5, 33.6